UNITED STATES PATENT OFFICE

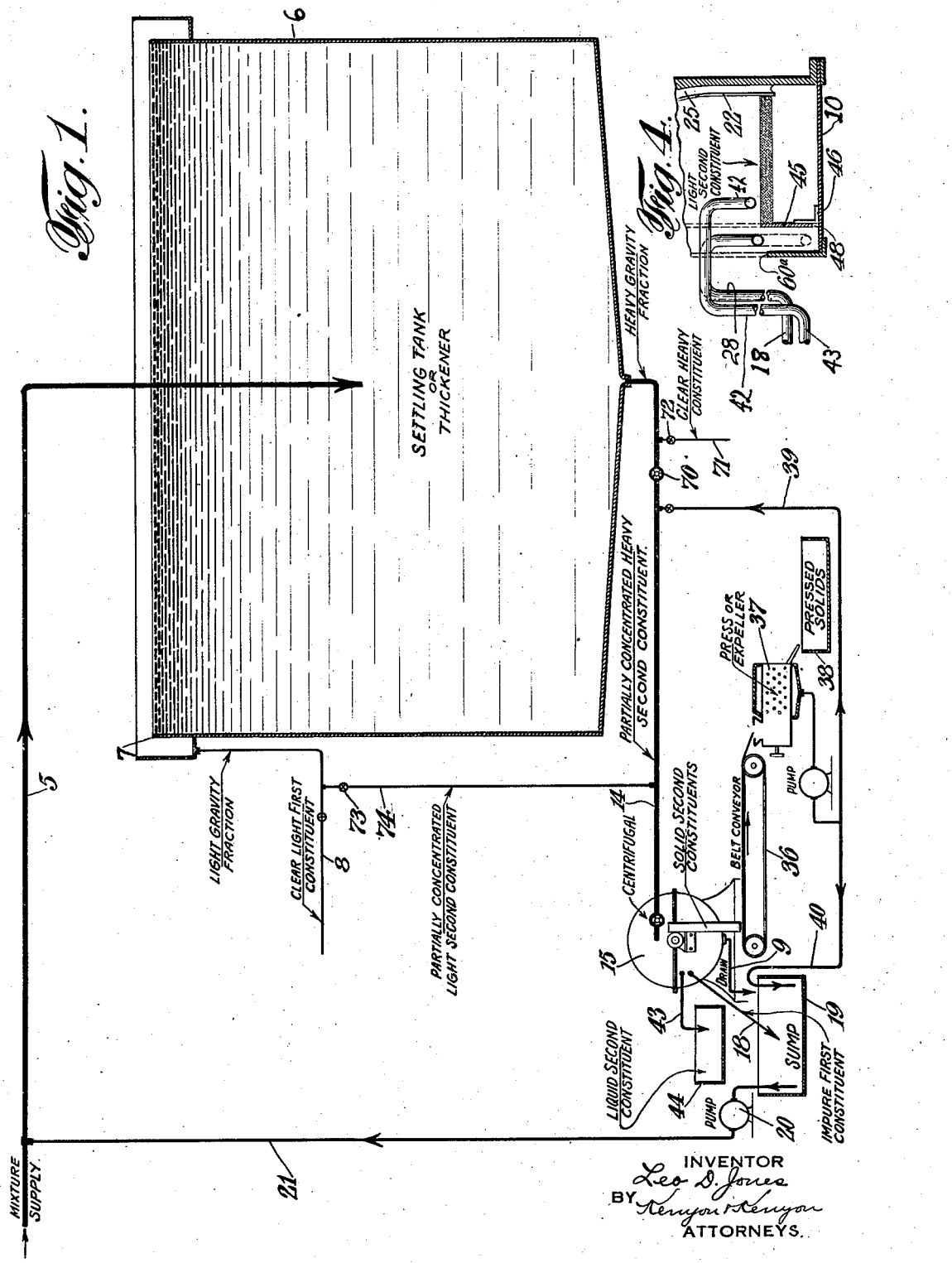

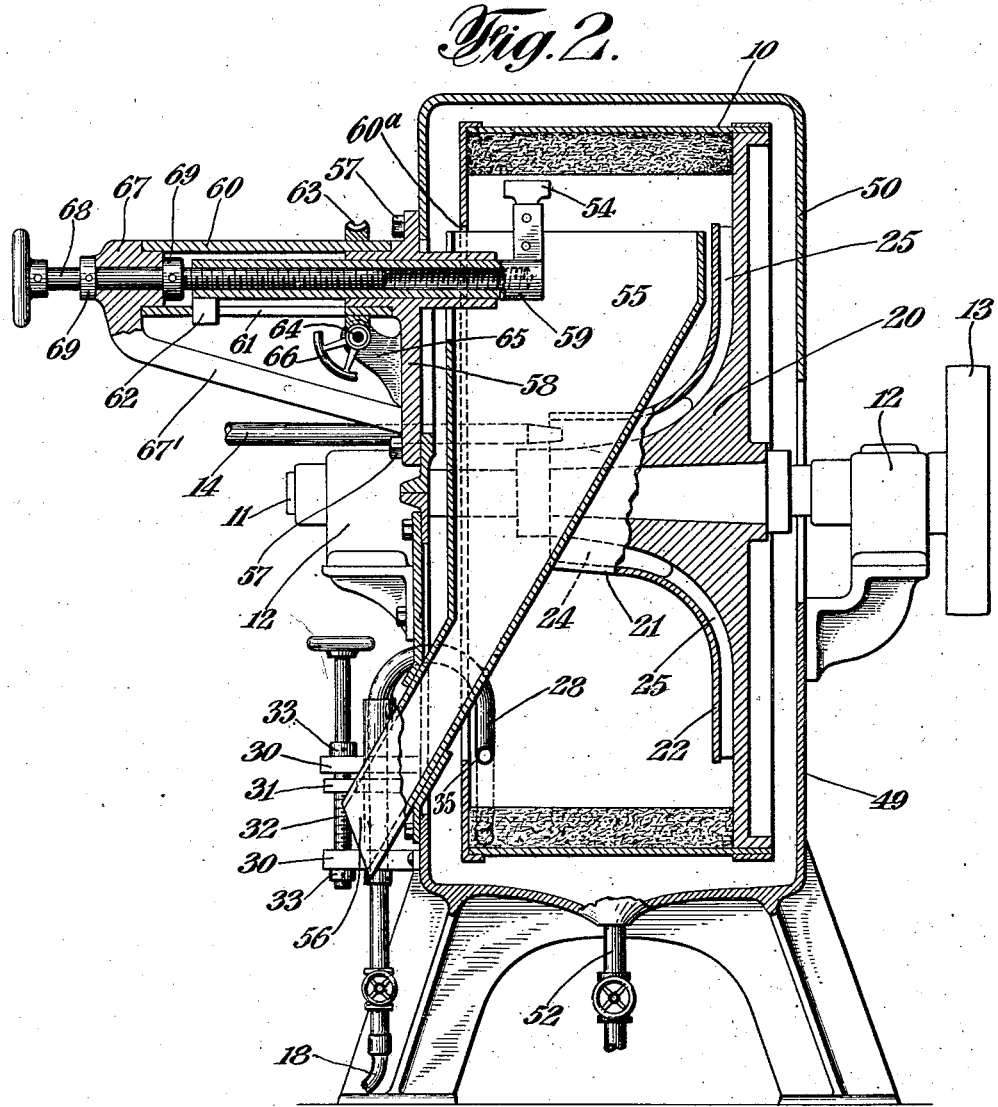
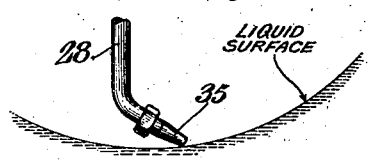

LEO D. JONES, OF PHILADELPHIA, PENNSYLVANIA, ASSIGNOR TO THE SHARPLES SPECIALTY COMPANY, OF PHILADELPHIA, PENNSYLVANIA, A CORPORATION OF DELAWARE

SEPARATION OF MIXTURES OF SUBSTANCES

Application filed May 19, 1928. Serial No. 279,077.

This invention relates to the separation of substances into constituent parts or fractions and particularly to separating operations involving the use of centrifugal force in cooperation with the use of other separating means.

When centrifugal force is employed in the separation of substances, the force acting to produce the desired result differs greatly in degree from the force that acts in separating substances by gravity, and in comparatively few instances is the effect of centrifugal force so employed the same in kind or nature as the effect of gravity. I have found that gravity will effect substantially no separation of some mixtures that can be separated to an appreciable extent or completely by centrifugal force; and I have found that fractions of a substance or mixture obtained by gravity separation possess characteristics different from the characteristics of fractions obtained by centrifugal separation from the same or similar substances or mixtures.

Thus, I have found that by gravity some mixtures may be separated into a first fraction that consists of some of a first constituent of the mixture and is substantially free of the other constituent or constituents of the mixture, and a second fraction that contains substantially all of a second constituent or constituents of the mixture but in which some of the first constituent is also present although in a smaller proportion than it is present in the original mixture. In such gravity separation such a second fraction contains an undesirable quantity of the first constituent and this condition results in loss of the first constituent and the second constituent or constituents are not sufficiently pure or free of the first constituent.

And, I have found that if the same or similar mixtures are separated by centrifugal separation, the second fraction produced by such separation consists of the second constituent in much more concentrated form and freed to a larger extent of the first constituent than is the second constituent in the second fraction produced in gravity separation, and the first fraction produced by centrifugal separation consists mainly of the first constituent but it is not sufficiently freed of the second or other constituents and usually consists of a cloudy liquid.

The mixtures above referred to, and to the separation of which this invention is well adapted, may be generally classified as suspensions of solid particles or discontinuous particles of immiscible liquid in a continuous liquid. Specific examples of mixtures to the separation of which this invention is well adapted are grape fruit juice containing pulp of the grape fruit, aluminum hydroxide precipitated in an aqueous solution, bodies of pulp-containing water occurring in paper manufacture, milk containing butter fat, and mixtures of water and mineral oil, such as heavy fuel oil. And, in the light of this description of my invention specific mixtures will be recognized or identified, which are additional to the specific examples above enumerated and which may or may not fall within the general class of substances above mentioned, as mixtures to the separation of which this invention is well adapted.

In the separation of mixtures of the character above referred to, gravity settling will produce in a relatively long period of time a first fraction consisting of clear and even brilliant liquid, and a second fraction that is of relatively large volume and consists of the second constituent mixed with a proportion of the first constituent that is undesirably large but is smaller than the proportion in which the first constituent is found in the original mixture; and centrifugal separation will produce in a relatively short period of time a first fraction consisting of liquid that is contaminated with the second constituent and is frequently cloudy, and a second fraction that is of relatively smaller volume and consists of substantially all of the second constituent freed of the first constituent to a higher degree than is the second fraction resulting from gravity separation.

Thus it appears that gravity separation is relatively slow and results in a second fraction containing substantially all of the second constituent (e. g. solids) but containing a large quantity of the first constituent (e. g. liquid) that contaminates the body of second constituent (e. g. the solids) and may be lost, whereas centrifugal separation is effective in concentrating the second constituent (e. g. solids) into a fraction substantially free of the first constituent (e. g. liquids), but centrifugal separation in the cases herein above referred to does not produce a first fraction (e. g. liquid fraction) that is desirably clear or free of the second constituent (e. g. solid-free).

Herein a reference to a constituent as being substantially free of another constituent, as, for example, a reference to a substantially liquid-free solid constituent, is intended to refer to a constituent that is as free of another constituent as it can be made in practice by the use of gravity or a modern high-speed centrifuge according to which is more suitable. In this sense a liquid-free solid constituent will usually be dry enough to be handled and passed to dryers of common form or may have an appearance of dryness similar to the appearance of a solid from which liquid has been squeezed or wrung out; but a solid may be liquid-free in the same sense even though it contains a surprisingly large percentage of liquid, and the mere appearance of the solid is not a dependable criterion. For example, a solid may be liquid-free in this sense even though it contains as much as 75% of water, and one solid containing that percentage of liquid may appear dry (e. g. paper pulp) while another solid containing the same or even a smaller percentage of water may have a decidedly fluid appearance (e. g. yeast) because of the differences in the character of the solids.

I have also found that in some cases centrifugal separation of such an original mixture into a fraction that contains substantially all of the second (e. g. solid) constituent and is substantially free of the first (e. g. liquid) constituent, and a fraction containing substantially all of the first (e. g. liquid) constituent but clouded, followed by a gravity settling of the clouded liquid fraction results in a smaller fraction of clear liquid than is obtained by gravity settling of the original mixture.

And, I have found that in some cases in which centrifugal separation of a mixture produces a liquid that is not desirably clear or free of another constituent, such other constituent (frequently in the form of a cloud in the liquid) will sometimes agglomerate but will not settle by gravity or separate out in a centrifuge. But, I have also found that if such contaminated (e. g. clouded) liquid is mixed with a fresh quantity of mixture, the liquid-fraction produced by gravity settling from the final mixture is clear even though gravity settling of the liquid-fraction produced by centrifuging, by itself, would not produce clear liquid.

The causes of such results are not readily explained and may be different in different cases, and I do not intend to be bound by any theory set forth herein in explaining such results. Foreign particles that would not settle by gravity in a reasonable time or under centrifugal force may agglomerate and settle with reasonable rapidity under the action of gravity to give a clear liquid although a liquid-fraction of equal clearness can not be obtained in centrifugal separation. Possibly the large forces applied in centrifugal separation prevent the agglomeration of finer particles into larger particles capable of settling, or the agitation of the mixture in the centrifugal bowl, such as might be due to bringing liquid up to speed, may impair separation or there may be insufficient time for agglomeration during the passage of the mixture through the centrifugal treatment.

Moreover, particles of different densities may agglomerate under the action of gravity whereas under the action of centrifugal force light particles, even though they had previously agglomerated with larger or denser particles, might be separated therefrom by the greater force acting on the heavier or denser particles. In the same connection, it is possible that the pressures or forces occurring in centrifugal treatment result in the liberation, by breaking up solids or semi-solids, or otherwise, of substances that would not be liberated in gravity settling but which cause the clouding of the liquid-fraction. Thus, in the centrifuging of the entire pulp of grape fruit the forces or pressures involved may liberate oils or other substances which cause a cloud in the liquid-fraction but which would not be liberated in gravity settling. The fact that when a cloudy centrifuge effluent will not give clear liquid by gravity settling, a clear liquid may nevertheless be obtained by gravity from a final mixture consisting of a quantity of fresh mixture and a quantity of effluent that will not settle, may result from the agglomeration or enmeshing of finer particles that would not settle in the centrifuge effluent with heavier impurities in the fresh mixture so added to that effluent, with the result that all impurities settle together by gravity giving clear liquid.

Also, the difficulty in producing by gravity a second fraction that is small and substantially free of the first constituent may be due to the fact that solids in the mixture form a network that is not compressed by gravity, or that the difference between the specific gravities of the constituents is small, or that the particles of solid or dispersed liquid are small, or that the viscosity of the continuous phase is so great that it is difficult to squeeze liquid out from between the discontinuous particles, or that discontinuous particles (e. g. oils such as fuel oil) coalesce under gravity to form a phase that is continuous but contains entrapped water which cannot escape by gravity because of the great viscosity of the oil.

Another element of centrifugal separating problems is that the apparatus involved requires for economical reasons that the substances recovered shall be of sufficient value to warrant the operation. The solid matter mixed with a liquid may be of such value that centrifugal treatment of large quantities of liquid contaning but little solid matter is uneconomical. Moreover the necessity for heating some mixtures prior to centrifugal separation may render uneconomical centrifugal separation of such mixtures when the entire mass has to be heated in preparation for such separation. Also, centrifugal treatment of the entire mass of such mixtures may result only in a large fraction consisting of clouded liquid, and a small cake of the solid.

It is an object of this invention to provide a method and apparatus whereby mixtures of the character above referred to may be readily and economically separated into two fractions one of which contains substantially all of a second constituent and a minimum quantity of a first constituent and the other of which contains the remainder of the first constituent and either consists of a single body of liquid containing a minimum second constituent, or, if desired, consists of two bodies of liquid, one of which is clear or brilliant and the other of which contains whatever cloud is unavoidable as a result of centrifugal separation.

In the separation of mixtures in accordance with this invention the mixture, especially a mixture of low concentration or a mixture from which centrifugal separation would produce only a clouded liquid fraction, is subjected to gravity settling in order to concentrate the second constituent which may be solid or liquid matter and produce as large a fraction of clear liquid first constituent as is practicable, and then the fraction in which the second constituent is concentrated is separated centrifugally into a component containing a minimum quantity of liquid first constituent and a liquid component which may be clouded. The last mentioned liquid component may be subjected to gravity settling to remove some or all of the cloud therefrom provided the substances involved are of such nature that the cloud will separate partially or completely under the action of gravity.

If, in the practice of this invention, it be undesirable to carry out a separate settling operation for the purpose of obtaining clear liquid from a cloudy fraction produced centrifugally, or if such a separate settling operation concentrates but little the cloud forming material, or if the cloud in such cloudy liquid will not settle by gravity even though it may agglomerate as above set out, the entire body of cloudy liquid or such a slightly concentrated product of the settling thereof, may be included in another batch of fresh mixture that is undergoing gravity settling and such gravity settling will produce clear liquid even though the cloudy liquid included in the final mixture would not produce clear liquid by gravity settling, all as above set out. Or, the cloudy liquid or the residue produced by settling thereof may be added to the settlings that are passing to the centrifuge. This invention may therefore be so practised that there are either two or three final products. In either case the second constituent is obtained in a state in which it is substantially free of the first or liquid constituent. In one case the first or liquid constituent may consist of separate bodies, one of which is clear and the other of which is clouded or it may consist of only one body of clear liquid, the cloudy liquid having been cleared by gravity separately or as a part of a new batch of mixture that is gravity settled.

In the practice of this invention centrifugal treatment of the entire mass of mixture is avoided, thus reducing the number or size of the centrifuges required, and all, or at least a substantial proportion, of the liquid obtained is clear or brilliant or contains a minimum of impurities; and heating which may be necessary as a preliminary to centrifugal separation, as in the case of oil-water mixtures, for example, need only be applied to a small body of settlings, the small body of settlings being obtained by gravity settling without heating.

Moreover the recovered second constituent, which may be solid or liquid contains a minimum of liquid and loss of liquid is avoided, and whatever part of the liquid fraction is clouded after the centrifugal separation constitutes but a small part of the original mixture that would, if the whole mass of the mixture were centrifugally treated, produce only cloudy liquid. There is an avoidance of the loss of a large part of the first-constituent liquid which is included in the second-constituent fraction resulting from gravity separation and contamination of the second constituent is minimized.

In the practice of this invention mixtures that may be separated by gravity settling into a fraction consisting of clear liquid and a fraction of relatively large volume and containing a second constituent and an undesirably large quantity of first-constituent liquid, and mixtures that may be separated centrifugally into a fraction in which the second constituent (e. g. solid matter) is in relatively concentrated form and a fraction consisting of cloudy liquid, and mixtures containing but little of one of their constituents, are separated into a second fraction in which the second constituent is in relatively concentrated form and a liquid fraction that is substantially clear, by simple operations carried out with a minimum of equipment. One of the steps of this invention separates the mixture into a fraction consisting of clear liquid and a fraction that contains a second constituent but also contains an undesirably large quantity of the liquid, and in the practice of this invention this result may be accomplished by gravity settling or by means of a filter of such form as will produce the desired clear liquid.

If the second constituent of the mixture treated consists of solid material it may be desirable that such solids be brought finally to a sufficiently liquid-free state to be handled and introduced into dryers. In the practice of this invention the solid-containing fraction produced by the settling or filtering operation will not be sufficiently liquid-free, it being impractical to subject to common forms of final drying solids that are mixed with so much liquid that the mass is fluid. A further feature of this invention is that the centrifugal separating step will either bring the solids to a sufficiently liquid-free state that they may be finally dried in a common form of dryer or will bring the solids to a condition in which they may be brought to such a state by means of apparatus that is of simple nature but is incapable of bringing to such a state the solid-containing fraction produced by mere gravity settling or filtering of the mixtures herein referred to.

In the practice of my invention, if a solid fraction produced by the centrifugal separating step is not sufficiently liquid-free to be handled in a common dryer it may be brought to that state by treatment in such simple apparatus as a press or expeller, a well known type of which is the Anderson expeller shown in United States Patents No. 829,314 and No. 829,315. If such a press or expeller is employed in the practice of this invention it bears a cooperative relation with other features of the invention that is similar to the cooperative relation between the centrifugal separating step and the settling or filtering step. Thus in the practice of this invention the cloudy liquid produced in the pressing or expelling step is returned to a point in the system that will insure that it will pass again through the effective separating steps, being returned either to the mixture entering the centrifuge or to the mixture entering the settling tank or filter.

If the mixture treated in accordance with this invention consists of one liquid in which particles of another liquid or semi-solid are suspended, such as for example, mixtures of oil and water that occur on shipboard and particularly on oil-burning ships, the dispersed constituent, such as oil, is concentrated by gravity settling without use of heat and only the relatively small second fraction or settlings require heating before centrifuging. In such mixtures containing fuel oil the concentrated second fraction obtained by gravity settling contains an undesirable quantity of water because the second or oily constituent is either so viscous that water cannot escape by gravity or the dispersed oil particles coalesce into a continuous oily phase containing entrapped water which may be dispersed in the oil or may constitute a continuous phase of the mixture.

In centrifuging such settlings to produce an oily constituent that is as water-free as possible, even a modern high speed centrifuge must frequently be so operated that oil escapes from the centrifuge with the water discharged therefrom and therefore the water fraction of the centrifugal separation is contaminated. In the practice of this invention such as contaminated water fraction may be partly purified by settling or it may be, and preferably is, returned to the gravity separating operation and mixed with fresh quantities of mixture therein.

Other and further objects and advantages of this invention will appear from the following description of a specific application of my invention or will be apparent in the light of this specification to those skilled in the art.

In the drawings in which like reference characters indicate similar parts,

Fig. 1 shows diagrammatically one form of apparatus embodying my invention and whereby my process may be practised;

Fig. 2 is a vertical sectional view of a centrifugal machine suitable for use in the practice of my invention;

Fig. 3 is a detail view; and

Fig. 4 shows a modified operation.

In the practice of my invention a mixture of the character above set forth is first separated, as by settling, into a fraction consisting of clear liquid and a fraction in which the second constituent, such as a solid or liquid, is concentrated but is mixed with a quantity of first-constituent liquid. To this end a mixture to be separated may be supplied by pipe 5 to the separating device which in the construction shown in Fig. 1 is a settling tank 6. The clear first-constituent liquid discharged from this separating device may be the only first-constituent liquid discharged finally from the system from which the only other substance finally discharged may be second constituent substantially free of first constituent. Thus the liquid may flow over weir 7 and be withdrawn through pipe 8 to any desired point. Mixture that is concentrated or thickened by this first separating operation and constituting the second fraction of the first separating operation is passed through pipe 14 to centrifuge 15.

The centrifuge 15 may be of any suitable construction but is preferably a centrifuge in which separation is effected by subsidence or sedimentation as contrasted with a mere straining or draining operation that is performed in a centrifuge having a perforated bowl. A centrifuge capable of effecting separation by sedimentation includes an imperforate bowl in which a layer of immiscible second-constituent liquid or a cake of solid material is formed by subsidence or sedimentation.

In the centrifuge shown in Figs. 1 and 2 imperforate bowl 10 is mounted on shaft 11 carried in bearings 12 attached to the lower casing 49 on which is mounted an upper casing 50, the centrifuge being rotated by pulley 13. Bowl 10 is provided with a hub 20, and a frusto-conical plate 21 having a flange 22 forms with hub 20 an inlet passage 24 that may be provided with vanes 25. Mixture is supplied through pipe 14 and separated into a liquid first-constituent layer and a layer of second constituent that may be liquid or solid material, the liquid first-constituent being discharged over the edge 60a of the bowl or through skimmer 42 or 28. Skimmer 28 is provided with nozzle 35 and is mounted for sliding in brackets 30 and carries a lug 31 in which is threaded a shaft 32 that passes through brackets 30 and is held against longitudinal motion therein by collars 33. By rotation of shaft 32 skimmer 28 may be adjusted to desired position to skim liquid from the surface of the liquid layer in the bowl, and then adjustment of skimmer 28 to positions radially outward from shaft 11 effects a removal of the layer of first-constituent liquid. Liquid withdrawn from the bowl by skimmer 28 passes through pipe 18 into collecting tank 19. Bowl casing 49 is provided with a drain 9 that discharges into tank 19.

Skimmer 42 is of exactly the same construction as skimmer 28 and is supported for adjustment by mechanism identical with that which supports skimmer 28 for adjustment. Liquids withdrawn through skimmer 42 are passed through pipe 43 to a collecting tank 44.

The bowl may be provided with an annular partition 45 supported by brackets 46 from the side wall of bowl 10, a passage 48 being provided between the outer edge of partition 47 and the inner wall of the bowl.

Solids collected in bowl 10 are removed therefrom by tool 54 mounted on shaft 59 that slides in plate 57 and carries a lug 62 which lies in slot 61 of cylindrical casing 60 that rotates on plate 57 and is held in place by plug 67 on which it rotates, plug 67 being attached to plate 57 by arm 67'.

Shaft 68 passes through plug 67 and is threaded into shaft 59 and held against longitudinal movement in plug 67 by collars 69. Worm shaft 64 carried in brackets 65 rotates worm wheel 63 that is connected to cylindrical housing 60, shaft 64 being rotated by hand wheel 66 (shown broken away in Fig. 2). Rotation of shaft 68 causes tool 54 to move back and forth across the body of solids in the bowl and rotation of shaft 64 causes the tool to swing toward and from the inner surface of bowl 10. Solids dislodged by tool 54 fall into hopper 55 and are discharged through chute 56. If the solids are not sufficiently free of liquid they may be passed, as by belt conveyor 36, to a press or expeller 37 of the type above referred to. Solids from the expeller are collected in contianer 38 while the liquid which will be cloudy may be passed by pipe 39 into supply pipe 14 of centrifuge 15 or passed by pipe 40 to tank 19. Cloudy liquid collected in tank 19 is returned by pump 20 through pipe 21 into the first separating operation as by being passed into supply pipe 5.

If the second constituent of the mixture is a heavy solid, the mixture will be continuously supplied through pipe 14 and the first constituent will be skimmed from the bowl by either skimmer 28 or 42, or discharged over weir 60a, until a layer of solid material of suitable depth has been formed and then one of the skimmers will be moved radially outward to skim off the layer of liquid in the bowl. Then the tool 54 will be operated to disintegrate and dislodge the cake and the solids will be discharged through chute 56.

If the second constituent of the mixture is a light solid it will float upon the first constituent as indicated in Fig. 4. During feeding of mixture liquid will pass through the passage 48 and discharge over weir 60a or will be skimmed out by skimmer 28 until a cake is formed. Then skimmer 28 will be moved radially outward to effect withdrawal of the liquid in the outer zone of bowl 10 and the cake will subside against the wall of the bowl and later be dislodged by tool 54.

If the mixture consists of two liquids the heavier liquid such as water may be discharged over weir 60a or skimmed out by skimmer 28, and the lighter liquid such as oil may be skimmed out by skimmer 42 and collected in container 44 while mixture is continuously fed through pipe 14. If the mixture consists of one liquid mixed with another liquid, or with a semi-solid that may be discharged continuously from the centrifuge either alone or by the aid of a carried liquid, then a centrifuge of the type shown in Patent No. 1,232,104 to P. T. Sharples may be employed, usually with better effect because such a centirfuge shown in that patent is operable at higher speeds. The Sharples centrifuge is well adapted to separation of oil-water mixtures occuring on ships.

If the second constituent comprising a solid material or dispersed liquid is lighter than the first constituent, for example, in the separation of oil from oil-water mixtures, the valve 70 in pipe 14 may be closed and clear first constituent may be withdrawn through pipe 71 by opening valve 72. In such case the solid mixed with liquid or the oil will pass out through pipe 8 and valve 73 in pipe 74 will be opened and the light second constituent will then pass through pipe 74 into the centrifuge 15. If the second constituent is a liquid it will be withdrawn by skimmer 42 and collected, substantially free of first constituent, in collecting tank 44.

While I have described certain embodiments of my invention and certain applications thereof in considerable detail it is to be understood that my invention is not limited to such details but includes such variations and modifications as fall within the hereunto appended claims. In this connection it is to be understood that the gravity separating operation may be carried out as a continuous operation or as a batch operation.

I claim:

1. In the separation of mixtures of liquids with solids which produce a cloudy liquid fraction when subjected to centrifugal separation or are of low solid concentration, or which is unseparable by filtration by reason of the slimy or colloidal nature of the second constituent, the steps comprising separating such a mixture by gravity into a first fraction consisting of clear liquid and a second fraction consisting of solid matter mixed with an undesirable quantity of liquid, centrifugally separating said second fraction into a component consisting of substantially liquid-free solids and a component consisting of cloudy liquid, and returning said cloudy liquid to the first mentioned separating operation.

2. In the separation of mixtures of liquids with solids which produce a cloudy liquid fraction when subjected to centrifugal separation or are of low solid concentration, the steps comprising separating such a mixture into a first fraction consisting of clear liquid and a second fraction consisting of solid matter mixed with an undesirable quantity of liquid, centrifugally separating said second fraction into a component consisting of substantially liquid-free solids and a component consisting of cloudy liquid, returning said cloudy liquid to the first mentioned separating operation, pressing said substantially liquid-free solids, and returning liquid resulting from said pressing operation to one of said separating operations.

3. In the separation of mixtures consisting of a liquid constituent and a solid constituent having an average specific gravity different from that of the liquid and of such nature as to clog filters, the steps comprising separating the mixture into a first component consisting of substantially solid-free liquid and a second component having a greater concentration of solid matter than the original mixture, centrifugally separating the second component and thereby producing a substantially liquid-free solid fraction and a liquid fraction, and returning the liquid fraction to the settling operation.

4. In the separation of mixtures consisting of a liquid constituent and a solid constituent having an average specific gravity different from that of the liquid, the steps comprising centrifugally separating the mixture into a liquid component and a component having a greater concentration of solids than the original mixture, pressing said second mentioned component, and returning to said separating step liquid resulting from said pressing step.

5. In the separation of paper pulp from water the steps comprising separating the mixture into a fraction consisting of substantially clear water and a fraction having a greater concentration of pulp than the original mixture, centrifugally separating said pulp containing fraction into a component consisting of cloudy liquid and a component comprising substantially all of the pulp, and returning said cloudy liquid to the first named separating operation.

6. In the separation of paper pulp from water the steps comprising separating the mixture into a fraction consisting of substantially clear water and a fraction having a greater concentration of pulp than the original mixture, centrifugally separating said pulp containing fraction into a component consisting of cloudy liquid and a component comprising substantially all of the pulp, returning said cloudy liquid to the first named separating operation, pressing the resulting pulp, and returning to one of said separating steps water resulting from said pressing operation.

7. In the separation of paper pulp from water the steps comprising separating the mixture by gravity into a fraction consisting of substantially clear water and a fraction having a greater concentration of pulp than the original mixture, centrifugally separating said pulp containing fraction into a component consisting of cloudy liquid and a component comprising substantially all of the pulp, and returning said cloudy liquid to the first named separating operation.

8. Apparatus for the separation of mixtures of liquids of relatively lower specific gravity with solids of relatively higher specific gravity which produce a cloudy liquid fraction when subjected to centrifugal separation or are of low solid concentration, comprising means for separating the mixture into a first fraction consisting of substantially clear liquid of relatively lower specific gravity and a second fraction of relatively higher specific gravity and containing a greater concentration of solid than the original mixture, centrifugal separating means, means for conducting said second fraction from said first named separating means to said centrifugal separating means, means for conducting liquid discharged from said centrifugal separating means to said first named separating means, a press for solids discharged from said centrifuge, and means for returning liquids from said press to one of said separating means.

9. In the separation of mixtures consisting of a liquid first-constituent and a solid constituent having a specific gravity greater than that of the liquid, the process comprising by gravity settling separating the mixture into a substantially solid-free liquid fraction and a fraction in which solid is concentrated, then introducing the solid-containing fraction produced by gravity settling into the influence of centrifugal force and continuously discharging from the influence of centrifugal force liquid containing solid while accumulating a cake of solid within the influence of centrifugal force, and returning to the gravity separating operation the liquid discharged from the centrifugal separating operation and containing solid.

10. In the separation of mixtures of liquids with solids having a greater specific gravity, which mixtures produce a cloudy liquid fraction when subjected to centrifugal force or are of low solid concentration, the steps comprising separating such a mixture by gravity into a lighter fraction consisting of clear liquid and a heavy fraction consisting of solid matter mixed with an undesirable quantity of liquid, centrifugally separating said second fraction into a heavier component consisting of substantially liquid-free solids and a lighter component consisting of cloudy liquid, and returning said lighter component to the first mentioned separating operation.

In testimony whereof, I have signed my name to this specification.

LEO D. JONES.